(12) United States Patent
Komura

(10) Patent No.: US 6,520,108 B1
(45) Date of Patent: Feb. 18, 2003

(54) SHAFT ARRANGEMENT OF INDICATING INSTRUMENT

(75) Inventor: Takashi Komura, Toyota (JP)

(73) Assignee: Denso Corporation, Kariya (JP)

(*) Notice: Subject to any disclaimer, the term of this patent is extended or adjusted under 35 U.S.C. 154(b) by 16 days.

(21) Appl. No.: 09/820,914

(22) Filed: Mar. 30, 2001

(30) Foreign Application Priority Data

Mar. 30, 2000 (JP) .......................................... 2000-097905

(51) Int. Cl.$^7$ .......................... G04B 29/00; G01D 13/04
(52) U.S. Cl. ........................ 116/284; 116/303; 368/324
(58) Field of Search ................................ 368/322, 323, 368/324, 220, 80; 116/284, 285, 286, 287, 288, 293, 303, 305, 62.1, 62.4; 464/80, 87, 88

(56) References Cited

U.S. PATENT DOCUMENTS

| | | | | |
|---|---|---|---|---|
| 120,335 A | * | 10/1871 | Simon | 368/324 |
| 1,561,673 A | * | 11/1925 | Ulery et al. | 368/144 |
| 2,638,866 A | * | 5/1953 | Sage | 116/294 |
| 2,674,447 A | * | 4/1954 | Sivacek | 73/519.01 |
| 2,757,364 A | * | 7/1956 | Hood | 116/204 |
| 3,054,054 A | * | 9/1962 | Donker | 324/155 |
| 3,110,284 A | * | 11/1963 | Napier | 116/284 |
| 3,443,375 A | * | 5/1969 | Cielazyk | 368/185 |
| 3,731,480 A | * | 5/1973 | Kurita | 368/125 |
| 3,978,438 A | * | 8/1976 | Aoki | 334/47 |
| 4,785,434 A | * | 11/1988 | Shoji et al. | 368/185 |
| 5,603,283 A | * | 2/1997 | Owen | 116/284 |
| 5,657,666 A | * | 8/1997 | Tsuda et al. | 74/421 A |
| 5,734,210 A | | 3/1998 | Keutz | 310/49 R |
| 6,043,574 A | | 3/2000 | Prudham | 310/49 R |
| 6,356,046 B1 | | 3/2002 | Koumura et al. | 318/696 |

FOREIGN PATENT DOCUMENTS

| | | | | |
|---|---|---|---|---|
| JP | | 9-21655 | 1/1997 | |
| JP | | 2001-99867 A | * 4/2001 | G01R/05/16 |

* cited by examiner

*Primary Examiner*—Diego Gutierrez
*Assistant Examiner*—R. Alexander Smith
(74) *Attorney, Agent, or Firm*—Harness, Dickey & Pierce, PLC

(57) ABSTRACT

An indicating instrument includes a dial plate, a casing disposed behind the dial plate, a drive control section disposed in the casing and a rotary shaft driven by the drive control section. The rotary shaft is comprised of a pair of thin shafts respectively supported by a pair of bearings and a thick shaft connecting the pair of thin shafts. Each thin shaft has such a length and an outside diameter that the ratio of the length to the outside diameter provides a sufficient bending strength. Therefore, the rotary shaft rotates smoothly and a pointer carried by the shaft indicates accurate values of a vehicle operating condition.

14 Claims, 4 Drawing Sheets

SHAFT ARRANGEMENT OF INDICATING INSTRUMENT

CROSS REFERENCE TO RELATED APPLICATION

The present application is based on and claims priority from Japanese Patent Application 2000-97905 filed Mar. 30, 2000, the contents of which are incorporated herein by reference.

BACKGROUND OF THE INVENTION

1. Field of the Invention

The present invention relates to various indicating instruments including a vehicular indicating instrument.

2. Description of the Related Art

In a vehicular indicating instrument, a drive unit has a drive control section disposed behind a dial plate and a rotary shaft extending through the dial plate to carry a pointer at the end thereof. The rotary shaft is connected to an output gear of a speed reduction gear train. The rotary shaft is usually made of a metal shaft that is integrated with the output gear.

Because the rotary shaft is considerably long and thin in order to provide a smooth and accurate operation of the pointer, it is very difficult to provide a sufficient bending strength. Therefore, the rotary shaft has to be very carefully handled not to bend when it is machined or heat-treated.

SUMMARY OF THE INVENTION

A main object of the invention is to provide an indicating instrument that has an improved rotary shaft.

Another object of the invention is to provide a rotary shaft that has a sufficient bending strength without sacrificing smooth and accurate operation of the pointer.

An indicating instrument according to a preferred embodiment of the invention includes a dial plate, a drive unit having a casing disposed behind the dial plate, a drive control section disposed in the casing, a rotary shaft driven by the drive control section and a pair of bearings fixed to the casing and a pointer carried by the rotary shaft. According to a feature of the invention, the rotary shaft is comprised of a thin shaft supported by at least one of the bearings disposed near the dial plate and a thick shaft having an end connected to the thin shaft, and the thin shaft has such a length and an outside diameter that the ratio of said length to said outside diameter provides a sufficient bending strength.

The rotary shaft may further include another thin shaft supported by the other of the pair of bearings, and the thick shaft has the other end connected to the other thin shaft, and the other thin shaft has also such a length and an outside diameter that the ratio of said length to said outside diameter provides a sufficient bending strength.

The thin shaft may be a stainless steel member, and the thick shaft may be a resinous member. The drive control section may include a speed reduction gear train having an output gear. In such a case the thick shaft may be integrated with the output gear. The ratio of each thin shaft, is, preferably, less than 10. The length of each thin shaft may be less than 10 mm, and the outside diameter of each thin shaft may be about 1 mm. Further, the thick shaft may be made of one of materials consisting of polyacetal and polyphenylene sulfide.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
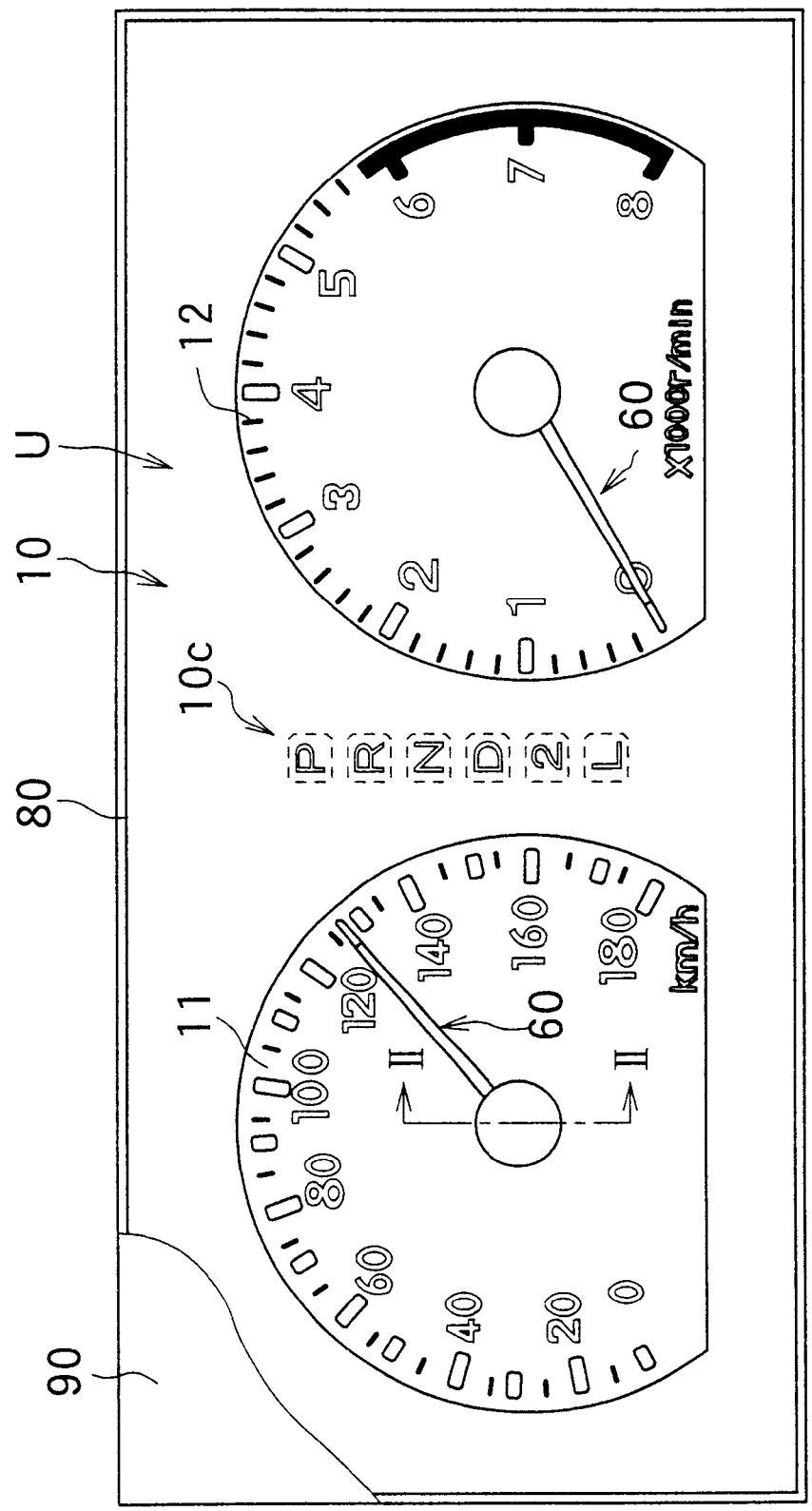
FIG. 1 is a front view and a partially cross-sectional view of an indicating instrument according to a first embodiment of the invention.

An indicating instrument according to a first embodiment of the invention is described with reference to FIGS. 1–3.

The indicating instrument according to the first embodiment is a combination meter to be mounted in an instrument panel of a vehicle. The indicating instrument includes a pair of meter units U, a speedometer and an engine tachometer. Each meter unit U is comprised of a common dial plate 10, a common light conducting plate 20, a common printed circuit board 30, a drive unit D and a pointer 60.

There are a pair of semi-circular transparent scale patterns 11 and 12 for the speedometer and the engine tachometer and an indicator pattern 10c for indicating positions of a gearshift lever on the dial plate 10.

The light conducting plate 20 is made of acrylic resin or polycarbonate and extended to cover the back of the dial plate that corresponds to the scale patterns 11 and 12 formed on the front surface thereof.

Figure 2:
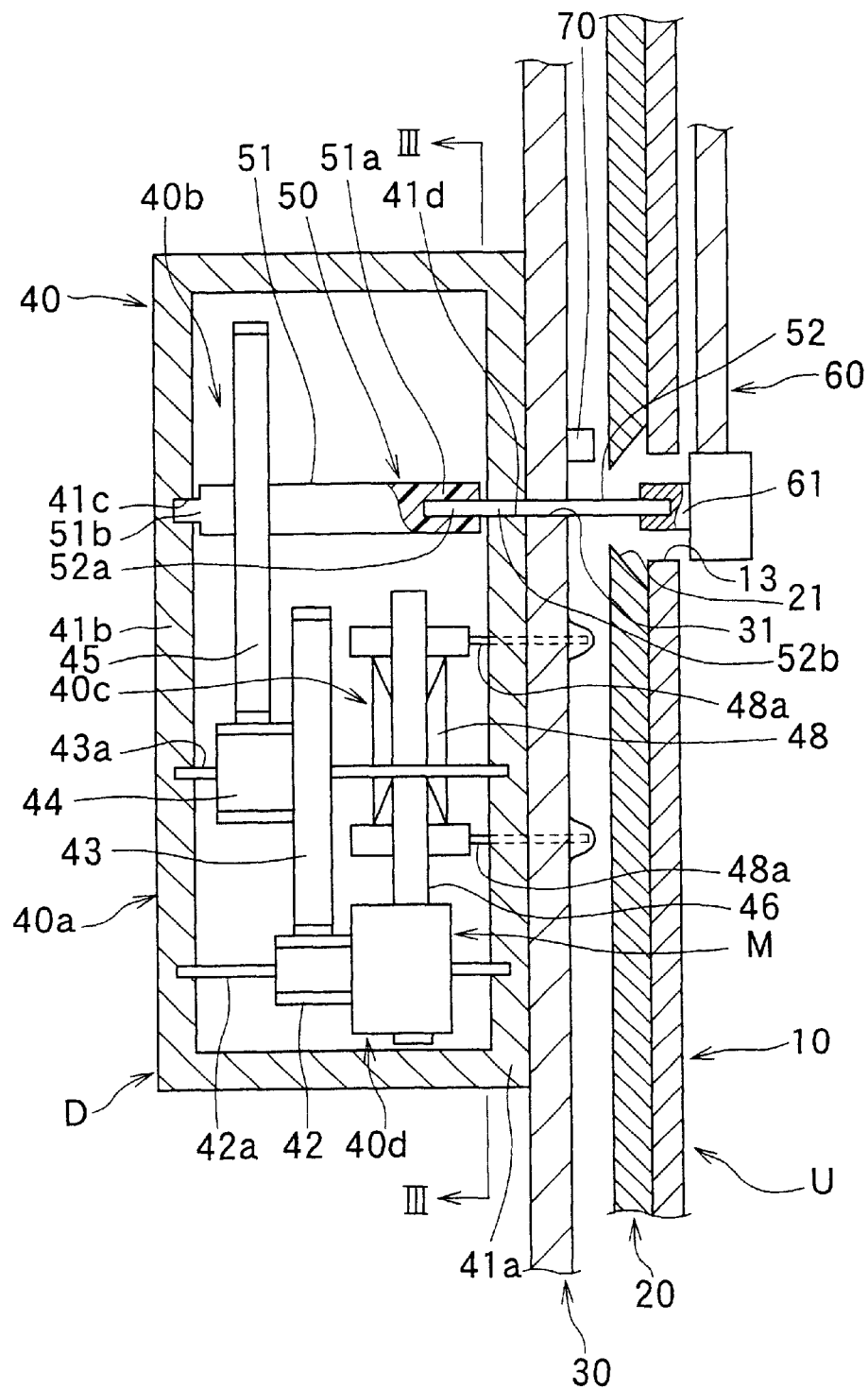
FIG. 2 is a cross-sectional side view of the indicating instrument illustrated in FIG. 1 cut along line II—II.
Figure 3:
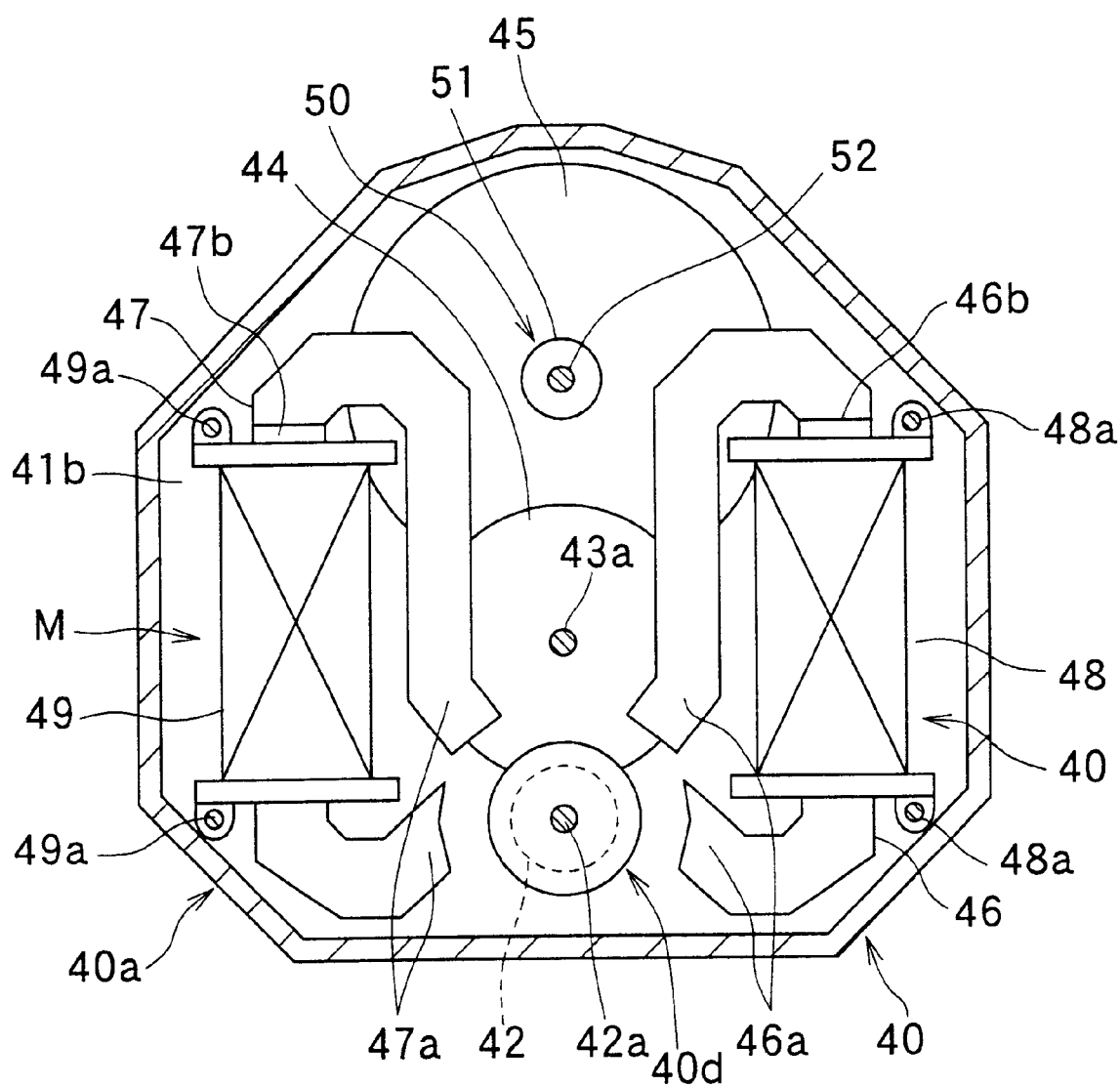
FIG. 3 is cross-sectional rear view of the indicating instrument illustrated in FIG. 2 cut along line III—III.

The light conducting plate 20 has a light reflecting film on the back thereof and a pair of through holes 21 at portions respectively corresponding to the speedometer and the tachometer, although only one through hole 21 for the left speedometer is shown in FIG. 2. The light conducting plate 20 has a prismatic or tapering light intercepting portion at the inner periphery of each through hole 21. The dial plate 10 has also a pair of through holes 13 at the same portions as through holes 21 of the light conducting plate 20.

The printed circuit board 30 is disposed at the back of the light conducting plate 30. Each drive unit D is comprised of a drive control section 40 and a rotary shaft 50. Each drive control section is mounted on the back of the printed circuit board 30 at the portion thereof corresponding to the through hole 21. Each drive control section 40 is comprised of a casing 40a, a speed reduction gear train 40b and a step motor M. The casing 40a has a ceiling plate 41a, which is fixed to the back of the printed circuit board 30 at the portion thereof corresponding to the through hole 21.

The speed reduction gear train 40b is comprised of four resinous spur gears 42–45 and is mounted in the casing 40a. The spur gears 42–45 are made of polyacetal, polyphenylene sulfide or the like. In the meantime, the polyacetal has a bending strength of about 100 N/mm² at temperature of 23° C., and the polyphenylene sulfide has a bending strength of about 200N/mm² at temperature of 23° C.

The spur gear 42 is rotatably supported by a gear shaft 42a between the ceiling plate 41a and a bottom plate 41b of the casing 40*a*. The spur gear 43 has a larger outside diameter than the spur gear 42. The spur gears 43 and 44, together, are supported by a shaft 43*a* between the plates 41*a* and 41*b*. The gear 44 has a smaller outside diameter than the gear 43. The gear 43 engages the gear 42. The spur gear 45 is supported by a rotary shaft 50 between the plates 41*a* and 41*b* and engages the gear 44.

The rotary shaft 50 is comprised of a pair of coaxially connected thick and thin shafts 51 and 52. The thick shaft 51 is made of the same resinous material as the spur gear 45, and the thin shaft 52 is made of a hard metal such as stainless steel or high speed steel. The outside diameter of the resinous shaft 51 is between 2 mm and 3 mm, and the length thereof is about 15 mm. The total length of the rotary shaft 50 is about 22 mm.

The resinous shaft 51 reduces the length of the thin metal shaft 52 having a small outside diameter to provide a sufficient bending strength. For example, the length of the stainless steel shaft 52 is about 10 mm and the outside diameter thereof is about 1 mm. That is, the ratio of the length of the stainless steel shaft 52 to the outside diameter of the shaft 52 is about 10.

The resinous shaft 51 is integrated with the spur gear 45, and an end of the metal shaft 52 is coaxially fitted to the edge of the resinous shaft 51. In the meantime, the resinous shaft 51 can be made separately from the gear 45. An end 51*b* of the resinous shaft 51 is rotatably supported by a bearing 41*c* formed at the bottom plate 41*b*. The metal shaft 52 is rotatably supported by a bearing 41*d* of the ceiling plate 41*a* at the middle 52*b* thereof and extends through a through hole 31 of the printed circuit board 30 and the through hole 21 of the light conducting plate 20 into the inside of the through hole 13 of the dial plate 10.

When molding the spur gear 45 and the resinous shaft 51 in a unit, an end portion of about 3 mm in length of the metal shaft 52 is inserted into the portion of a mold die corresponding to the resinous shaft 51.

Thus, the length of the metal shaft 52 can be made very short and the outside diameter can be made very small. As a result, the pointer is driven very smoothly to indicate very accurate measured value such as a vehicle speed or an engine rotation speed.

The step motor M is mounted in the casing 40*a*. The step motor M is comprised of a stator 40*c* and a rotor 40*d*. The stator 40*c* is fixed to the ceiling plate 41*a*. as shown in FIG. 3, the stator 40*c* has a pair of yokes 46 and 47 and a pair of field coils 48 and 49. The pair of yokes 46 and 47 is fixed to the ceiling plate 41*a*. The yoke 46 has a pair of poles 46*a* that faces the rotor 40*d*, and the yoke 47 has a pair of poles 47*a* that faces the rotor 40*d* and the pair of yokes 46*a* via the rotor 40*d*.

The field coil 48 is wounded at an intermediate portion 46*b* of the yoke 46, and the field coil 49 is wound at an intermediate portion 47*b* of the yoke 47. The field coils 48 has an end 48*a* and the field coil 49 has an end 49*a*, both of which are respectively inserted into holes of the printed circuit board 30 and soldered to a circuit of the printed circuit board 30 in a reflow or flow process. When the pair of field coils 48 and 49 is powered by an electric power source through the printed circuit board 30, the field coils 46 and 47 and the pair of yokes 46 and 47 provide a magnetic field to rotate the rotor 40*d*.

The rotor 40*d* is comprised of a permanent magnet and supported by the shaft 42*a* coaxially with the spur gear 42. The pointer 60 has a base portion 61 carried by an end of the rotary shaft 50. Therefore, the pointer 60 is driven by the step motor M via the speed reduction gear train 40*b* and the shaft 50. Reference numeral 70 in FIG. 2 indicates a light emitting diode for illuminating the dial plate 10. The light emitting diode 70 is soldered to a portion of the printed circuit board 30 near the through hole 21 of the light conducting plate 20. The light emitting diode 70 emits light toward the prismatic light intercepting portion of the through hole 21 and, through the light conducting plate 20, over a wide range of the dial plate 10. If a plurality of light emitting diodes are disposed uniformly behind the dial plate 10, the light conducting plate 20 can be omitted. Reference numeral 80 indicates a face shield member, and reference numeral 90 indicates a front panel.

Figure 4:
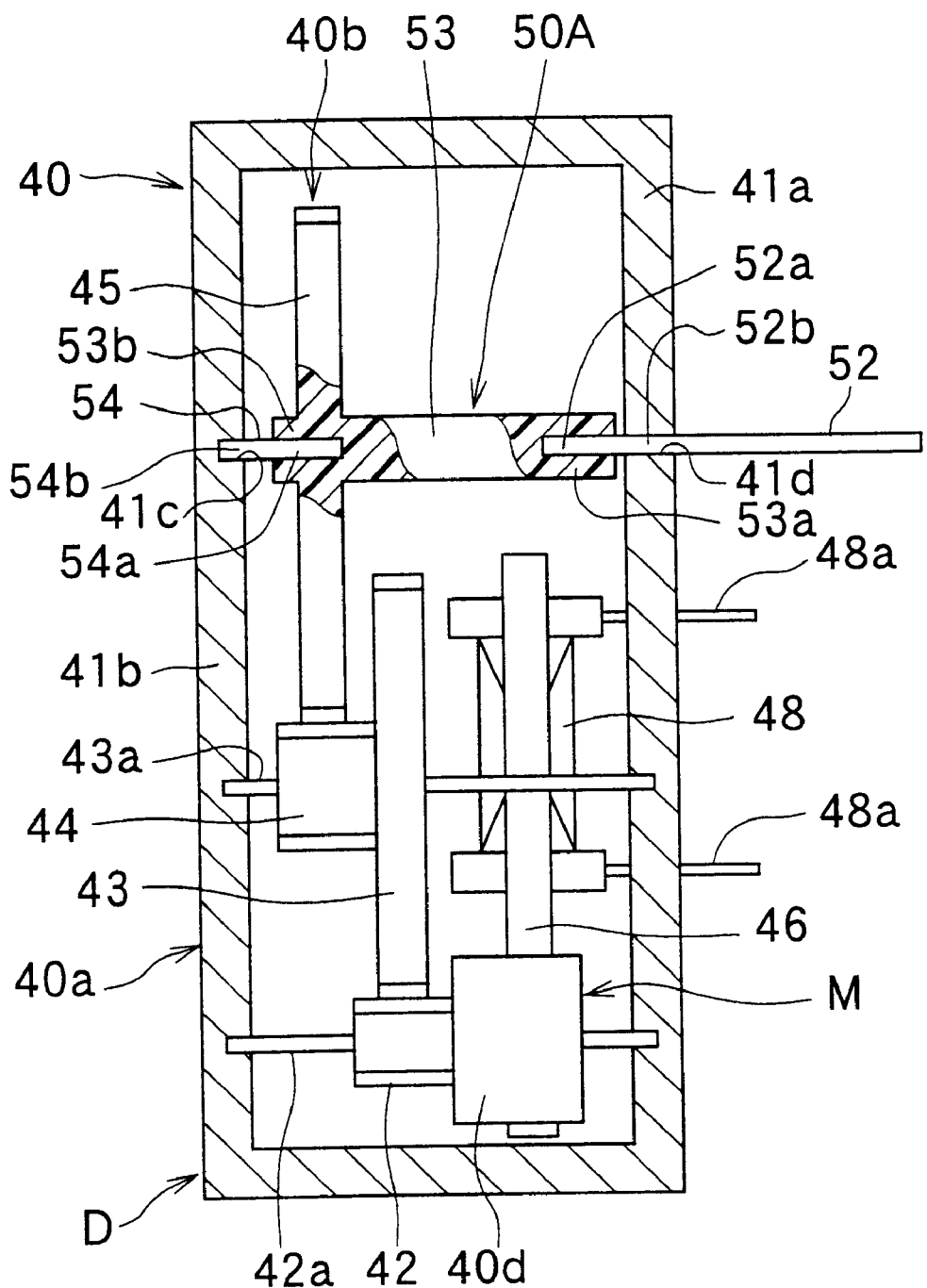
FIG. 4 is a cross-sectional side view of the indicating instrument according to a second embodiment of the invention.

An indicating instrument according to a second embodiment of the invention is described with reference to FIG. 4.

The rotary shaft 50 of the indicating instrument according to the first embodiment is replaced by a rotary shaft 50A. The rotary shaft 50A is comprised of a thin metal shaft 54, a resinous shaft 53 and the same thin metal shaft 52 as that of the first embodiment, which are coaxially connected in series. The resinous shaft 53 is integrated with the spur gear 45 in the same manner as the resinous gear 51 of the first embodiment. The metal shaft 54 is made of the same material as the metal shaft 52. The right end 54*a* of the metal shaft 54 is insert-molded into the left end 53*b* of the resinous shaft 53 in the same manner as the metal shaft 52. The left end 54*b* of the metal shaft 54 is rotatably supported by the bearing 41*c* of the bottom plate 40*a*. The total length of the shaft 54 is about 5 mm and the outside diameter of the shaft 54 is the same as the metal shaft 52.

Because the thin metal shaft 54 is short enough to maintain a ratio of the length thereof to the outside diameter thereof, a sufficient bending strength can be provided although it is much thinner than the end 51*b* of the resinous shaft 51. As a result, the shaft 50A can be driven more smoothly than the shaft 50 of the indicating instrument according to the first embodiment of the invention.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An indicating instrument comprising:

a dial plate;

a drive unit having a casing disposed behind said dial plate, an electric motor, a rotary shaft connected to said electric motor and extending from said casing toward said dial plate and a pair of bearings fixed to portions of said casing spaced apart from each other for supporting said rotary shaft; and a pointer carried by said rotary shaft; wherein said rotary shaft comprises a hard metal shaft member directly supported by one of said pair of bearings disposed near said dial plate and a resinous shaft member directly supported by the other of said bearings; and said hard metal shaft member is thinner than said resinous shaft member.

2. The indicating instrument as claimed in claim 1, wherein a ratio of the length to an outside diameter of said metal shaft member is about 10.

3. The indicating instrument as claimed in claim 2, wherein
said length of said hard metal shaft member is about 10 mm, and
said outside diameter of said hard metal shaft member is about 1 mm.

4. The indicating instrument as claimed in claim 1, wherein
said resinous shaft member is made of one of materials consisting of polyacetal and polyphenylene sulfide.

5. The indicating instrument as claimed in claim 1, wherein
said drive unit comprises a resinous gear disposed between said electric motor and said resinous shaft thereby driving said pointer by said electric motor, and wherein
said resinous gear is integrated with said resinous shaft member.

6. An indicating instrument comprising:
a dial plate;
a drive unit having a casing disposed behind said dial plate, a step motor, a gear train connected to said step motor, a rotary shaft having one end connected to said gear train and the other end extending from said casing toward said dial plate and a pair of bearings fixed to portions of said casing spaced apart from each other for supporting said rotary shaft; and
a pointer carried by said rotary shaft; wherein
said rotary shaft comprises a hard metal shaft member at potions less than a half thereof directly supported by one of said pair of bearings disposed near said dial plate and a resinous shaft member at the rest thereof directly supported by the other of said bearings; and
said hard metal shaft member is thinner than said resinous shaft member.

7. The indicating instrument as claimed in claim 6, wherein
said gear train has an output gear integrated with said resinous shaft thereby driving said pointer.

8. An indicating instrument comprising:
a dial plate;
a drive unit having a drive control section disposed behind said dial plate, a rotary shaft having one end extending toward said dial plate and a pair of bearings spaced apart from each other for supporting said rotary shaft, said drive control section including a casing that includes a pair of plates in parallel with each other and said pair of bearings respectively fixed to said pair of plates, a step motor disposed in said casing and a speed reduction gear train disposed in said casing and having an input gear connected between the other end of said rotary shaft and said step motor and an output gear connected coaxially to said rotary shaft; and
a pointer carried by said rotary shaft; wherein
said rotary shaft comprises a hard shaft member having said one end and a portion directly supported by one of said pair of bearings disposed near said dial plate and a resinous shaft member integrated with said output gear at said other end directly supported by the other of said pair of bearings; and
said hard metal shaft member is thinner than said resinous shaft member.

9. An indicating instrument comprising:
a dial plate;
a drive unit having a drive control section disposed behind said dial plate, a rotary shaft having one end extending toward said dial plate and a pair of bearings spaced apart from each other for supporting said rotary shaft, said drive control section including a casing that includes a pair of plate members in parallel with each other and said pair of bearings respectively fixed to said pair of plate members, a step motor disposed in said casing and a speed reduction gear train disposed in said casing and having an input gear connected to said step motor and an output gear connected coaxially to said rotary shaft; and
a pointer carried by said rotary shaft; wherein
said rotary shaft comprises a hard metal shaft member at said one end directly supported by one of said pair of bearings disposed nearer to said dial plate and a resinous shaft member directly supported by the other of said pair of bearings; and
said hard metal shaft member is shorter and thinner than said resinous shaft member.

10. The indicating instrument as claimed in claim 9, wherein
said output gear is integrated with said resinous shaft member.

11. The indicating instrument as claimed in claim 10, wherein
said hard metal shaft member is made of one of materials including stainless steel and high speed tool steel.

12. An indicating instrument comprising:
a dial plate;
a drive unit having a casing disposed behind said dial plate, a drive control section disposed in said casing, a rotary shaft driven by said drive control section and a pair of bearings directly fixed to portions of said casing spaced apart from each other for supporting said rotary shaft; and
a pointer carried by said rotary shaft; wherein
said rotary shaft comprises a hard metal shaft directly supported by one of said pair of bearings disposed near said dial plate and a resinous shaft connected to said hard metal shaft, said resinous shaft being disposed within said casing, and
said hard metal shaft is thinner than said resinous shaft.

13. The indicating instrument as claimed in claim 12, wherein
said hard metal shaft comprises a stainless steel member.

14. The indicating instrument as claimed in claim 13, wherein
said drive control section comprises a speed reduction gear train having an output gear, and
said resinous shaft is integrated with said output gear.

* * * * *